TRANSFORMERLESS MODULATING AND FILTERING APPARATUS

Filed June 22, 1964 2 Sheets-Sheet 1

INVENTOR.
ADRIAN J. MOSES
BY
Bruce C Lutz
ATTORNEY

INVENTOR.
ADRIAN J. MOSES

BY

Bruce C. Lutz

ATTORNEY 3,329,910

TRANSFORMERLESS MODULATING AND FILTERING APPARATUS

Adrian J. Moses, Rush City, Minn., assignor to Honeywell Inc., Minneapolis, Minn., a corporation of Delaware Filed June 22, 1964, Ser. No. 377,007
12 Claims. (Cl. 332—31)

This invention is concerned generally with switching circuits and more particularly with switching circuits for use as filters, modulators, or characterizing means.

One embodiment of the invention utilizes switching means on the input and output sides of a capacitor to alternately connect the input or the output to a reference or ground potential. When the output is grounded the capacitor charges up to the input potential level and when the input is grounded the output receives a signal indicative of the amplitude of the input signal due to the charge on the capacitor. This circuit thus modulates the input signal. Due to the method of connection, the circuit acts as a quadrature filter in that the quadrature portion of the input signal is not allowed to pass to the output.

Another embodiment of the invention utilizes two sets of series connected transistor switches and capacitors in parallel between a portion of a circuit and ground. The input of this circuit has a large RC (resistor-capacitor) time constant as compared with the complete cycle time of the input signal. Therefore the capacitors charge up slowly so as to increase the amplitude of the output signal with each succeeding cycle until the output and the input are of approximately the same potential. In other words, this embodiment provides an AC amplitude lag function.

A third embodiment of the invention uses two of the second embodiment circuits wherein different size capacitors are incorporated so that a "hi-pass filter" is provided. In this embodiment the signal is allowed to pass to the output for a time depending on rate of change of the input signal due to one portion of the circuit having a small RC time constant while the other portion has a large RC time constant. The output signal will decrease in amplitude until the two portions of the circuits allow the same amplitude, but opposite phase signals to be applied through summing resistors to the output. These opposite phase signals then cancel each other so that the resultant output signal is a minimum amount.

An object of this invention is to provide improved switching circuits for use in filter apparatus.

Other objects and advantages of this invention may be ascertained from a reading of the specification and appended claims in conjunction with the drawings in which:

Figure 1:
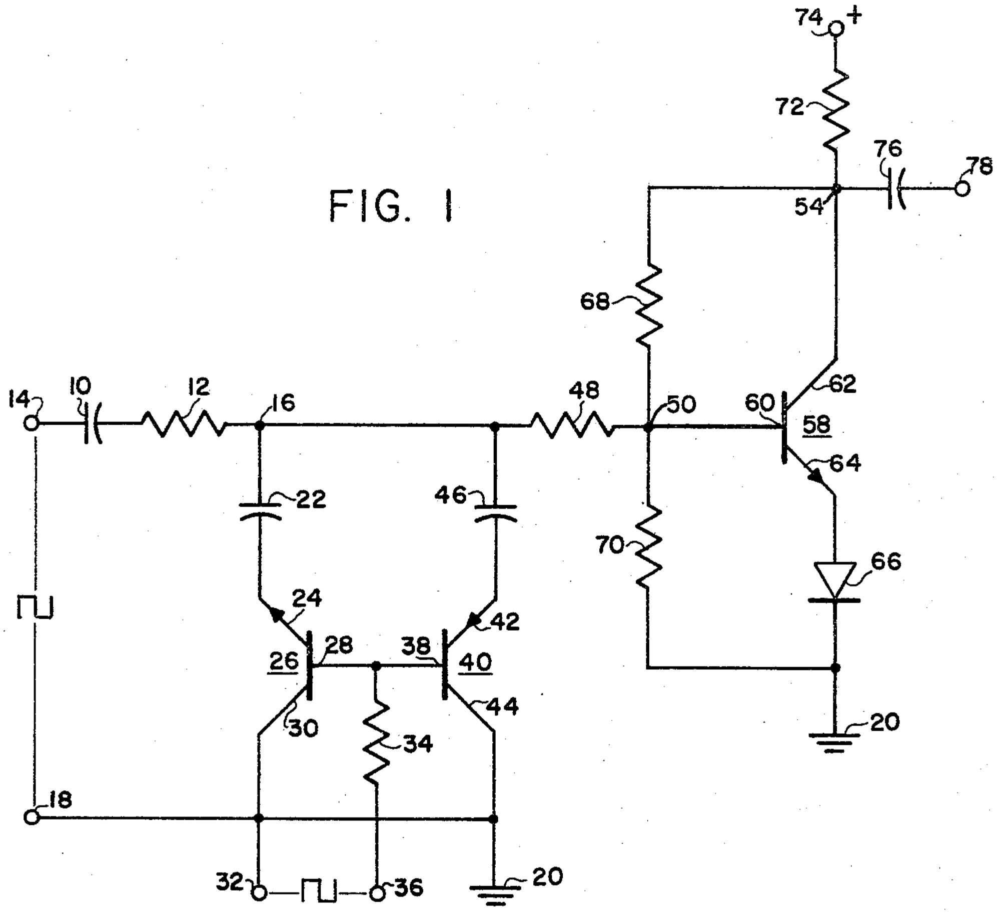
FIGURE 1 is a schematic diagram of an amplitude lag circuit.

In FIGURE 1 a capacitor 10 is connected in series with a resistor or impedance means 12 between an input 14 and a junction point 16. An input signal is applied between the input means 14 and an input means 18 which is connected to ground or reference potential 20. A capacitor means or energy storage means 22 is connected between the junction point 16 and an emitter 24 of an NPN transistor means, switching means, or valve means 26 having a base 28 and a collector 30. The collector 30 is connected to ground 20 and to another terminal 32. A resistive means 34 is connected between a reference signal supplying terminal 36 and the base 28 of transistor 26. The base 28 is also connected to a base 38 of a PNP transistor switching means or valve means generally designated as 40 having an emitter 42 and a collector 44. The collector 44 is connected to ground 20 while a capacitor means or energy storage means 46 is connected between the junction point 16 and the emitter 42 of transistor 40. A resistor or impedance means 48 is connected between the junction point 16 and a terminal or junction point 50. Further an NPN transistor or amplifying means 58 is shown having a base 60, a collector 62, and an emitter 64. A diode 66 is connected between ground 20 and the emitter 64 such that the direction of easy current flow is from the emitter 64 toward ground 20. The collector 62 of transistor 58 is connected to a terminal 54 while base 60 is connected to terminal 50. A resistor 68 is connected between the terminal 50 and terminal 54. Another resistor 70 is connected between the terminal 50 and ground 20. A resistor 72 is connected between a positive power terminal 74 and terminal 54. A capacitive means or impedance 76 is connected between terminal 54 and an output means 78.

Figure 2:
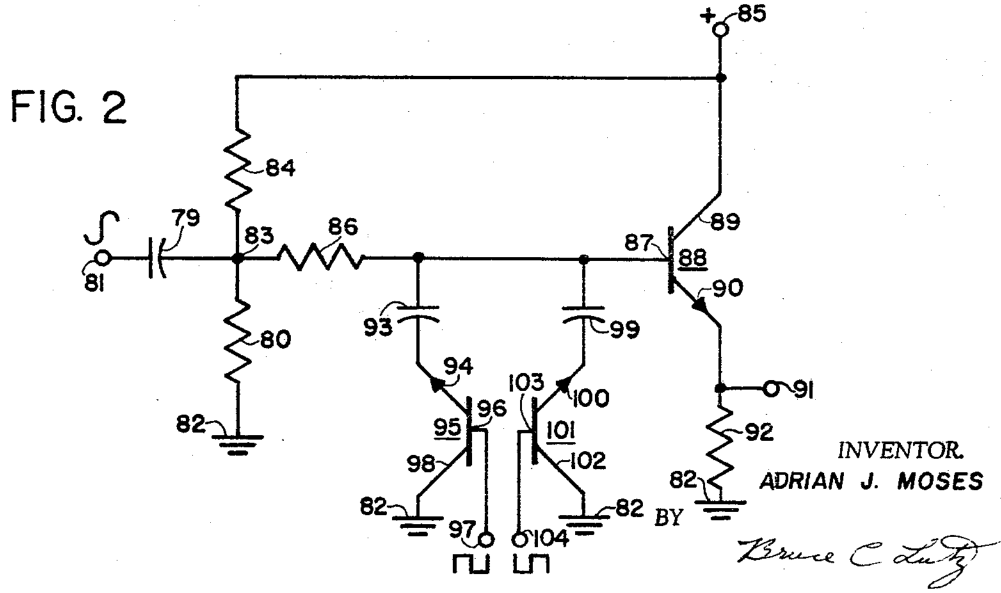
FIGURE 2 illustrates alternate circuit structure for obtaining the results of FIGURE 1.

FIGURE 2 shows a capacitor 79 connected in series with a resistive means 80 between an input terminal means 81 and ground or reference potential 82. A point intermediate the capacitor 79 and resistance means 80 is designated as junction point 83. A resistive means 84 is connected between the junction point 83 and a positive power terminal designated as 85. A resistive means 86 is connected between junction point 83 and a base 87 of a valve means, switching means, amplifying means, or NPN transistor means generally designated as 88. A collector 89 of transistor 88 is connected to positive power terminal 85 while an emitter 90 of transistor 88 is connected to an output terminal 91. A resistance means 92 is connected between output terminal means 91 and ground 82. A capacitor or capacitive means 93 is connected between base 87 and an emitter 94 of a switching means, valve means, grounding means or NPN transistor means generally designated as 95. Transistor 95 has a base 96 connected to a switching input terminal 97 while a collector 98 of transistor 95 is connected to ground 82. Another capacitor or capacitive means 99 is connected between base 87 of transistor 88 and an emitter 100 of a valve means, amplifying means, switching means, grounding means, or NPN transistor means generally designated as 101. Transistor 101 has a collector 102 connected to ground 82 and has a base 103 connected to a switching input terminal 104.

Figures 3, 4:
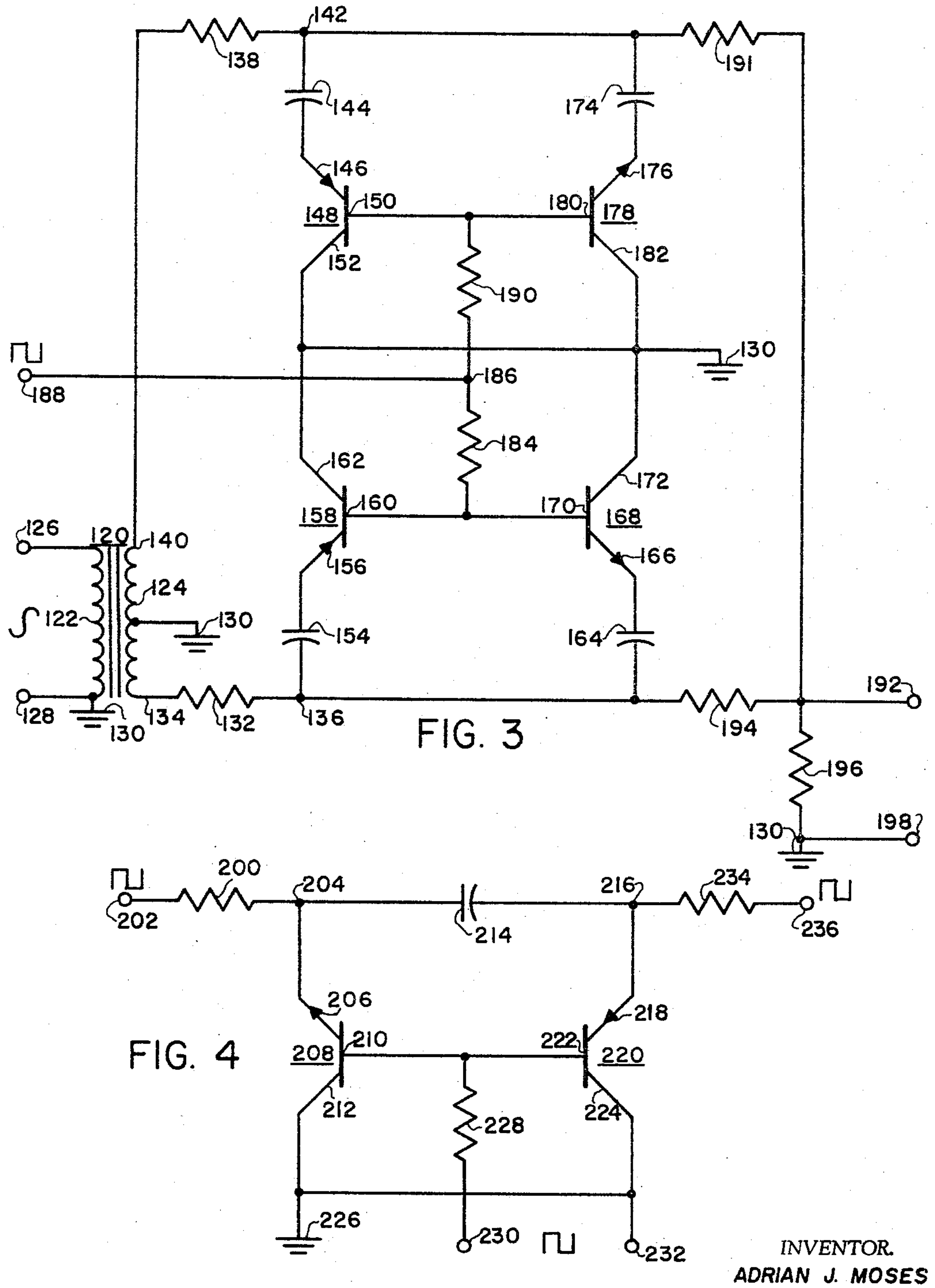
FIGURE 3 is a schematic diagram utilizing the teaching of FIGURE 1 for providing a hi-pass filter.
FIGURE 4 is a schematic diagram of a quadrature filter or modulating circuit.

In FIGURE 3 a transformer generally designated as 120 has a primary winding 122 and a secondary winding 124. The ends of the primary winding 122 are connected between signal input terminal means 126 and 128 with 128 being connected to ground or reference potential 130. A tap on winding 124, in this embodiment shown as a center tap, is also connected to ground 130. A resistor means or impedance means 132 is connected between one end 134 of winding 124 and a junction point 136. A resistor means or impedance means 138 is connected between the other end 140 of the winding 124 and a junction point 142. A capacitor means or energy storage means 144 is connected between the junction 142 and an emitter 146 of a PNP transistor switching means or valve means generally designated as 148 and having a base 150 and a collector 152. A capacitor means or energy storage means 154 is connected between the junction point 136 and an emitter 156 of a PNP transistor switching means or valve means 158 having a base 160 and a collector 162. A capacitor means or energy storage means 164 is connected between junction point 136 and an emitter 166 of an NPN transistor switching means or valve means generally designated as 168 having a base 170 and a collector 172. A capacitor means or energy storage means 174 is connected between the junction point 142 and an emitter 176 of an NPN transistor switching means or valve means generally designated as 178 and having a base 180 and a collector 182. The collectors of each of the four transistors in FIGURE 3 are connected together and to ground 130. One end of a resistor 184 is connected to the bases 160 and 170 while the other end is connected to a junction point 186 and further to a switching or reference signal input terminal 188. Another resistance or impedance means 190 is connected between the junction point 186 and commonly connected bases 150 and 180 of transistors 148 and 178 respectively. A resistor or impedance means 191 is connected between junction point 142 and an output terminal means 192. Another resistor or impedance means 194 is connected between junction point 136 and the output terminal 192. The resistors 191 and 194 constitute a summing means or circuit for the two phases of the input signal. A resistor 196 is connected between the output terminal 192 and another output terminal 198 which is further connected to ground 130.

In FIGURE 4 a resistive means or impedance means 200 is connected between an input terminal means 202 and a junction point 204. Junction point 204 is further connected to an emitter 206 of an NPN transistor switching means or valve means generally designated as 208 having a base 210 and a collector 212. A capacitor means or energy storage means 214 is connected between junction point 204 and a junction point 216 which is further connected to an emitter 218 of a PNP transistor switching means or valve means generally designated as 220 and having a base 222 and a collector 224. Collector 224 is connected to collector 212 and further to ground potential 226. A resistor 228 has one end connected to bases 210 and 222 while the other end is connected to a switching input terminal 230. A terminal 232 is connected to collector 224. A switching input signal or reference signal is supplied between the terminals 230 and 232. A resistor means or impedance means 234 is connected between junction point 216 and an output terminal means 236.

*Operation*

It may be assumed that a signal of the same phase as is applied between terminals 14 and 18 is applied between terminals 32 and 36. The signal applied between 14 and 18 is the input signal which is to be acted upon by the circuit. This signal may be square as shown or may be any other suitable waveshape such as a sine wave. The circuit will delay the input signal in that the output amplitude will lag behind the input upon changes in input amplitude. The signal applied between terminals 32 and 36 is a switching or control signal. The switching signal may, but need not be, of the same waveform as the input signal. This signal applied between base and collector of the two switching transistors 26 and 40. This type of connection is different from the normal method of connecting an input signal to a transistor. However, transistors used in this form of connection, while possibly having a lower gain, will operate otherwise the same as if the control signal were connected between the base and the emitter. The advantage derived from this connection is a lower voltage drop across the emitter-collector electrodes of a transistor. When the signals applied between terminals 36 and 32 are such that terminal 36 is positive with respect to 32, transistor 26 will turn to an ON or energized condition thereby effectively connecting capacitor 22 between terminal 16 and ground 20 while transistor 40 remains in an OFF or uneregized condition so that capacitor 46 has no particular effect on the circuit. When terminal 36 is negative with respect to terminal 32, transistor 40 will be energized thereby effectively connecting capacitor 46 between terminal 16 and ground 20 while transistor 26 remains unenergized or in a non-conducting condition so that capacitor 22 has no particular effect on the circuit. If an input signal is now applied to terminal 14, at the same time that transistor 26 is energized, it will be observed that capacitor 22 will begin charging toward the potential applied at terminal 14. If the input signal is of a phase such that 14 is positive going at this point in time, the plate or electrode of the capacitor 22 which is connected to junction point 16 will become positive with respect to the plate or electrode which is connected to the emitter 24 of transistor 26 and therefore effectively connected to ground 20. On the next half cycle transistor 40 will be energized and the input terminal 14 will be negative with respect to ground 20 and therefore the electrode of capacitor 46 which is connected to junction point 16 will charge negative with respect to the capacitive plate connected to emitter 42 and therefore effectively connected to ground 20. With proper design, the resistor 12 can be made large enough and/or the capacitors 22 and 46 can be of a large enough capacitive value so that the capacitors 22 and 46 will charge to the full half cycle potential over a time period of several cycles. The voltage at terminal 50 will then be an alternating signal which at the end of the first half cycle is some small portion of the applied voltage in the positive direction. The voltage at the end of the second half cycle will be a small negative potential. At the end of the third half cycle the potential at junction point 50 will be a slightly larger positive signal than appeared at the end of the first half cycle due to the additional charging of capacitor 22. Thus, the output will slowly build up in amplitude over a period of several half cycles until the capacitors 22 and 46 are fully charged. The output will then remain at this amplitude until the input amplitude again changes. After the further change in the input amplitude, the capacitors 22 and 46 will again charge or be discharged such that the changed value of input signal amplitude is eventually received at junction point 50. The transistor 58 amplifies the input signal and applies it to the output terminal 78.

The circuit as described will operate very satisfactorily with nonpolarized capacitors. However, it may be desirable to use a polarized capacitor which can often be produced in a much smaller form for the same capacitive value than nonpolarized units. The diode 66 in FIGURE 1 permits the biasing resistors 68 and 70 to raise the base 60 of transistor 58 a slight amount above ground due to the voltage drop through diode 66. The base 60 can be raised further off ground as more diodes are utilized to provide the voltage dropping function of diode 66. This will permit polarized capacitors of a voltage rating large enough to operate under any given input signal. These polarized capacitors may be connected such that their positive terminal or electrode is connected to junction point 16 and the voltage rating of these capacitors normally will have to be at least the sum of the half wave voltage of the input signal and the bias voltage appearing at junction point 50. This voltage rating is necessary to protect the capacitors where the total input signal is added to the bias voltage appearing at junction point 50. It will also be realized that the bias voltage must be greater than the maximum amplitude of the input signal so that the polarized capacitor which has the negative going signal applied there across is not reverse biased.

The circuitry of FIGURE 2 will provide somewhat the same function as the circuitry of FIGURE 1 but is considerably more stable in operation upon changing of the resistors in the RC time constant portion of the circuit. This circuit has a further advantage of being useable with matched pairs of like polarity transistors which are more readily available than matched pairs of complementary symmetry transistors. Since transistor 88 is connected in the common collector or emitter follower configuration, the input impedance to this transistor will be comparatively high. In view of the high input impedance, the resistor 86 may be altered in resistance value over a wide range without substantially affecting the circuit gain. This is due to the fact that the input impedance of transistor 88 is much higher than the values normally used for resistance 86. To provide the most satisfactory operation, the parallel sum of the resistance of resistors 80 and 84 should be quite small as compared to the resistance of resistor 86. Since the two transistors 95 and 101 are the same polarity, it is necessary to have oppositely phased switching signals applied to their bases 96 and 103 respectively. In view of the description given with FIGURE 1, it is believed apparent to one skilled in the art that FIGURE 2 will operate substantially identically to FIGURE 1. In other words, an input signal will be applied to capacitors 93 and 99 such that they will charge over a period of several cycles of the input signal applied to 81 and thereby gradually raise the amplitude of the signal applied to base 87 of transistor 88 and thus the output signal will lag in amplitude changes in the amplitude of the input signal applied to 81. As is previously mentioned in conjunction with FIGURE 1, the switching and input signals of FIGURE 2 may be either sine wave or square wave or any other suitable form which may be desirable for the particular application involved.

In analyzing FIGURE 3, it may be assumed that the sine wave signal applied to the primary 122 of transformer 120 is of the same phase as the square wave switching signal applied to switching input terminals 188. The switching signal is not to be limited to a square wave as shown since other waveforms will operate satisfactorily. Since a tap on the secondary 124 of transformer 120 is connected to ground 130, the signal at lead or end 140 will be of a phase opposite the signal at lead or end 134. If the four switching transistors are removed, the two signals, if of the same amplitude at the ends of the transformer secondary 124 and further if the four resistors were the same resistance value, will be summed at the output 192 and will cancel the effect of each other so that there will be no output signal. As previously mentioned, the purpose of this circuit is to provide apparatus which will allow an output upon the change of an input signal and to have this output slowly decrease in amplitude with time so that after several cycles, there will be no further output until another change in input amplitude occurs. If the two capacitors 154 and 164 are of a larger capacitive value than the capacitors 144 and 174, it will take the capacitors 154 and 164 longer to charge to the amplitude of the signal supplied than it will take the capacitors 144 and 174. Therefore, the signal through resistor 191 will be of a larger amplitude than the signal through resistor 194 so as to provide an output signal of a phase identical with the phase of the signal through resistor 191. However, after several cycles (the number depending upon the design of the circuit) the charge on the four capacitors will be identical and there will be no further output signal from the circuit. On the basis of similarity to the circuitry of FIGURE 1 it may be determined that transistors 178 and 168 will turn ON so that capacitors 174 and 164 respectively will charge while transistors 148 and 158 remain in the unenergized or OFF condition. During the next half cycle, transistors 148 and 158 will become energized so as to allow the capacitors 144 and 154 to charge while the other two transistors are in an unenergized or nonconducting condition. The output signals will appear across resistor 196 to ground.

The apparatus shown in FIGURE 4 may be termed either a quadrature filter or a modulator. Again, the input signal appearing at 202 may be assumed to be in phase with the control or reference signal applied to the switching terminals 230 and 232. These transistors are also connected in the inverted condition in a manner similar to that of FIGURE 1. The signal appearing at the output terminal 236 will be a pulsating signal and will have a direct voltage component indicative of the amplitude of the in phase component of the signal applied at terminal 202. The term "in phase" may be defined as the same phase as the control signal. If the signal is in phase as originally assumed and if the terminal 204 is positive with respect to ground when transistor 208 is in an ON condition, any charge across the capacitor will be applied from ground to terminal 216 and therefore to output terminal 236 since transistor 220 is de-energized. On the next half cycle, transistor 208 will be de-energized and transistor 220 will connect the junction point 216 to ground thereby placing at ground or shorting to ground one electrode of capacitor 214. At this time the negative input at 202 will charge the capacitor 214 such that the plate connected to junction point 204 is negative with respect to the plate connected to 216. On the following half cycle the transistor 208 is energized thereby connecting junction point 204 to ground 226 and the output terminal 236 is constrained to be at a positive potential indicative of the amplitude of the negative charging voltage which charged capacitor 214 on the previous half cycle.

It may be now assumed that the input signal is at a 90° phase relationship with the switching signal. While the transistor 220 is energized, the capacitor 214 will be charged in one potential or polarity direction for 90 electrical degrees and then charged, or discharged, in the opposite direction for the next electrical 90°. As long as the capacitor does not approach a fully charged condition, it may be determined that the two equal amounts of time to charge in the two different polarity directions will result in a zero potential across capacitor 214. On the next half cycle of the switching signal when transistor 208 is energized, the output terminal 236 will not be placed at positive or a negative potential since capacitor 214 does not have any resulting charge thereacross. Therefore, the quadrature signals will not be allowed through the circuitry. As the input signal is changed in phase with respect to the switching signal toward the in phase condition, the output will increase to a maximum when the two signals are in phase.

From the above description, it will be obvious to one skilled in the art that many modifications can be made to the invention and that it is not my intention to be limited strictly by the disclosure. For example tubes or other switching units may be used instead of some of the transistors recited. Also a source of opposite phase signals other than transformers may be used. Further, more than one amplifying unit can be used instead of single units such as transistor 58.

I therefore desire by invention to be limited only by the scope of the following claims in which I claim.

1. Filter apparatus comprising in combination:
input means for receiving an alternating signal;
output means;
reference potential means;
first and second impedance means connected in series between said input means and said output means and having a first junction therebetween;
first capacitor means and first transistor switch means connected in series between said first junction and said reference potential means;
second capacitor means and second transistor switch means connected in series between said first junction and said reference potential means;
third and fourth impedance means connected in series between said input means and said output means and having a second junction therebetween;
third capacitor means and third transistor switch means connected in series between said second junction and said reference potential means, the third capacitor means having a larger capacitive value than said first capacitor means;
fourth capacitor means and fourth transistor switch means connected in series between said second junction and said reference potential means, the fourth capacitor means having a larger capacitive value than said second capacitor means; and
switching signal means connected to said first, second, third, and fourth transistor switch means for supplying switching signals thereto to energize said first and third transistor switch means and thereby effectively connecting said first and third capacitor means between said first and second junctions respectively and said reference potential means while simultaneously de-energizing said second and fourth transistor switch means for a predetermined period, the switching signal in a consecutive predetermined period de-energizing said first and third transistor switch means while simultaneously energizing said second and fourth transistor switch means and thereby effectively connecting said second and fourth capacitor means between said first and second junctions respectively and said reference potential means.

2. Filter apparatus comprising in combination:
input means for receiving an alternating signal;
output means;
reference potential means;
first and second impedance means connected in series between said input means and said output means and having a first junction therebetween;
first capacitor means and first transistor switch means connected in series between said first junction and said reference potential means;
third and fourth impedance means connected in series between said input means and said output means and having a second junction therebetween;
second capacitor means and second transistor switch means connected in series between said second junction and said reference potential means, the second capacitor means having a larger capacitive value than said first capacitor means;
switching signal means connected to said first and second transistor switch means for supplying switching signals thereto to energize said first and second transistor switch means and thereby effectively connecting said first and third capacitor means between said first and second junctions respectively and said reference potential means, the switching signal in a consecutive predetermined period de-energizing said first and second transistor switch means.

3. Filter apparatus comprising in combination:
input means adapted to receive an alternating signal;
output means;
reference potential means;
first and second impedance means connected in series between said input means and said output means and having a first junction therebetween;
first energy storage means and first switch means connected in series with said first junction and said reference potential means;
third and fourth impedance means connected in series between said input means and said output means and having a second junction therebetween;
second energy storage and second switch means connected in series between said second junction and said reference potential means, the second energy storage means having a larger storage capacity than said first energy storage means; and
switching signal means connected to said first, and second switch means for supplying switching signals thereto to energize said first and second switch means and thereby effectively connecting said first and second energy storage means between said first and second junctions respectively and said reference potential means.

4. Filter apparatus comprising in combination:
input means for receiving an alternating signal;
output means;
reference potential means;
first and second impedance means connected in series between said input means and said output means, a junction means situated intermediate said first and second impedance means;
first capacitor means and first transistor switch means connected in series between said junction means and said reference potential means;
second capacitor means and second transistor switch means connected in series between said junction means and said reference potential means; and
switching signal means connected to said first and second transistor switch means for supplying switching signals thereto to energize said first transistor switch means and thereby effectively connecting said first capacitor means between said junction means and said reference potential means while simultaneously de-energizing said second transistor switch means for a predetermined period, the switching signal in a consecutive predetermined period of de-energizing said first transistor switch means while simultaneously energizing said second transistor switch means and thereby effectively connecting said second capacitor means between said junction means and said reference potential means.

5. Amplitude lag circuit apparatus comprising in combination:
input means for supplying an alternating signal;
output means;
reference potential means;
first and second impedance means connected in series between said input means and said output means, a junction means situated in series between said first and second impedance means;
capacitor means and transistor switch means connected in series between said junction means and said reference potential means; and
switching signal means connected to said transistor switch means for supplying a switching signal thereto to energize said transistor switching means and thereby effectively connecting said capacitor means between said output means and said reference potential means for a predetermined period, the switching signal in a consecutive period de-energizing said transistor switch means.

6. Switching apparatus comprising in combination:
input means for receiving an alternating signal;
output means;
reference potential means;
first and second impedance means connected in series between said input means and said output means a junction means situated intermediate said first and second impedance means;
first energy storing means and first switch means connected in series between said junction means and said reference potential means;
second energy storing means and second switch means connected in series between said junction means and said reference potential means; and
switching signal means connected to said first and second switching means for supplying switching signals thereto to energize said first switch means and thereby effectively connecting said first energy storing means between said output means and said reference potential means while simultaneously de-energizing said second switching means for a predetermined period, the switching signal in a consecutive predetermined period de-energizing said first switching means while simultaneously energizing said second switch means and thereby effectively connecting said second energy storing means between said output means and said reference potential means.

7. Modulator apparatus comprising in combination:
input impedance means;
output impedance means;
reference potential means;
capacitor means connected between said input means and said output means for reducing a charge indicative of signals applied to said input impedance means and for periodically applying a signal indicative of the charge to said output impedance means;

first transistor switch means connected between said input impedance means and said reference potential for periodically reducing the potential of said input impedance means to said reference potential; and second transistor switch means connected between said output impedance means and said reference potential for periodically reducing the potential of said output impedance means to said reference potential between the periods said input means is at said reference potential.

8. Modulator apparatus comprising in combination:

input means;

output means;

reference potential means;

energy storage means connected between said input means and said output means;

first switch means connected between said input means and said reference potential for periodically placing said input means at said reference potential and for applying to said output means a signal indicative of any stored energy in said energy storage means; and second switch means connected between said output means and said reference potential for periodically placing said output means at said reference potential between the periods said input means is placed at said reference potential, said energy storage means receiving a signal indicative of the integrated value of any signals applied to said input means while said output means is connected to said reference potential.

9. Quadrature filter apparatus comprising, in combination:

input means for receiving an alternating input signal;

output means for supplying an alternating output signal;

reference potential means;

capacitor means connected between said input means and said output means; and transistor switch means, having a given switching rate and connected to said input means, said output means and said reference potential, for alternately placing first said input means and then said output means at said reference potential, the output signal having an amplitude indicative of a phase relationship between said input signal and the switching rate.

10. Modulator apparatus comprising in combination:

input means for supplying an input signal;

output means for supplying an alternating output signal;

reference potential means;

capacitor means connected between said input means and said output means; and transistor switch means, having a given switching rate and connected to said input means, said output means and said reference potential, for alternately placing first said input means and then said output means at said reference potential, the output signal having an amplitude indicative of the integrated amplitude of said input signal for a time period equal to the reciprocal of the switching rate.

11. Modulator apparatus comprising in combination:

input means for supplying an input signal;

output means for supplying an alternating output signal;

ground means;

energy storage means connected between said input means and said output means; and switch means, having a given switching rate and connected to said input means, said output means and said ground means, for alternately grounding first said input means and then said output means.

12. Electrical apparatus comprising:

apparatus input means;

apparatus output means;

reference potential means;

switch means, having first and second terminal means for alternately connecting the first and then the second terminal means to the reference potential; and energy storage means connected to the apparatus input means, the apparatus output means, the first terminal means, and the second terminal means.

References Cited

UNITED STATES PATENTS

| | | | |
|---|---|---|---|
| 2,863,123 | 12/1958 | Koch | 332—31 |
| 3,021,431 | 2/1962 | Wellman | 307—88.5 |
| 3,075,150 | 1/1963 | Berman et al. | 329—101 X |
| 3,243,707 | 3/1966 | Cottrell | 329—101 X |

ROY LAKE, *Primary Examiner.*

ALFRED L. BRODY, *Examiner.*